(12) United States Patent
Lee (10) Patent No.: US 9,854,563 B2
(45) Date of Patent: Dec. 26, 2017

(54) BANDWIDTH CONTROL IN WIRELESS COMMUNICATION

(71) Applicant: Empire Technology Development LLC, Wilmington, DE (US)

(72) Inventor: Hyoung-Gon Lee, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 327 days.

(21) Appl. No.: 14/118,707

(22) PCT Filed: Jun. 21, 2013

(86) PCT No.: PCT/US2013/046991
§ 371 (c)(1),
(2) Date: Nov. 19, 2013

(87) PCT Pub. No.: WO2014/204482
PCT Pub. Date: Dec. 24, 2014

(65) Prior Publication Data
US 2014/0378178 A1 Dec. 25, 2014

(51) Int. Cl.
*H04B 7/00* (2006.01)
*H04W 72/04* (2009.01)
*H04W 4/00* (2009.01)
*H04L 1/00* (2006.01)
*H04W 28/20* (2009.01)

(52) U.S. Cl.
CPC .......... *H04W 72/04* (2013.01); *H04L 1/0001* (2013.01); *H04L 1/0033* (2013.01); *H04W 4/00* (2013.01); *H04L 1/00* (2013.01); *H04W 28/20* (2013.01)

(58) Field of Classification Search
CPC ............................. H04W 28/0226; H04W 4/25
See application file for complete search history.

(56) References Cited

U.S. PATENT DOCUMENTS 5,455,964 A * 10/1995 Roos .................. H03J 7/02
  342/418
5,513,221 A    4/1996 Parr et al.
6,816,452 B1  11/2004 Maehata
(Continued)

OTHER PUBLICATIONS

John G. Proakis, Digital Communications, McGraw-Hill, Second Edition, 1989, pp. 713-716.*
(Continued)

*Primary Examiner* — Mohammed Rachedine
(74) *Attorney, Agent, or Firm* — Brundidge & Stanger, P.C.

(57) ABSTRACT

Technologies are generally described for a bandwidth control scheme. In some examples, a transmitter device configured to transmit information via a wireless connection may include a baseband signal processor configured to process the information to generate a baseband signal with a baseband bandwidth; a modulator configured to modulate a radio frequency (RF) signal with an RF bandwidth based on the baseband signal; and a controller configured to adjust at least one of the baseband bandwidth and the RF bandwidth based on a movement of the transmitter device relative to a position of a receiver device configured to receive the RF signal.

20 Claims, 9 Drawing Sheets

(56) References Cited

U.S. PATENT DOCUMENTS

| | | |
|---|---|---|
| 2005/0020219 A1* | 1/2005 | Sih .................. H04B 1/707 |
| | | 455/130 |
| 2005/0163235 A1 | 7/2005 | Mo et al. |
| 2005/0272379 A1* | 12/2005 | Rotta ............. H04B 7/18513 |
| | | 455/67.16 |
| 2007/0197165 A1 | 8/2007 | Klotsche et al. |
| 2007/0293256 A1 | 12/2007 | Merched et al. |
| 2008/0137716 A1 | 6/2008 | Lakkis |
| 2009/0029657 A1* | 1/2009 | Sakaishi .......... H04W 56/0035 |
| | | 455/113 |
| 2009/0267591 A1 | 10/2009 | Roberts |
| 2010/0130213 A1* | 5/2010 | Vendrow .......... H04M 3/42374 |
| | | 455/445 |
| 2012/0208558 A1* | 8/2012 | Bajko et al. ............... 455/456.1 |
| 2014/0196116 A1* | 7/2014 | Maguire ................ H04L 51/32 |
| | | 726/4 |

OTHER PUBLICATIONS

Lee, D.S., "Bandwidth-reservation scheme based on road information for next-generation cellular networks," IEEE Transactions on Vehicular Technology, vol. 53, Issue 1, Jan. 2004, pp. 243-252.

X. Li. et al., "Intercarrier Interference Immune Single Carrier OFDM via Magnitude-Keyed Modulation for High Speed Aerial Vehicle Communication," IEEE Transactions on Communications, vol. 61, Issue 2, Feb. 2013, pp. 658-668.

International Search Report and Written Opinion for International Patent Application No. PCT/US2013/046991 dated Sep. 4, 2013.

\* cited by examiner

BANDWIDTH CONTROL IN WIRELESS COMMUNICATION

CROSS-REFERENCE TO RELATED APPLICATION

This Application is the U.S. National Stage filing under 35 U.S.C. §371 of International Application No. PCT/US13/46991, filed on Jun. 21, 2013.

BACKGROUND

Radio resources for use in wireless communications are generally expensive and thus need to be used in a more efficient manner. On the other hand, conventional wireless communication systems often do not fully utilize the entire frequency bandwidth allocated to the systems. For example, both ends of an allocated bandwidth may be assigned as guard bands which are used not for data communication but for preventing interference between adjacent channels. Such interference may be caused due to various characteristics of wireless communication components. For example, a low-pass filter used in baseband signal processing may not completely block signal/power leakage out of an occupied bandwidth due to its general circuit characteristics. The guard bands may be reduced if it is possible to extend an occupied bandwidth to match the allocated bandwidth by enhancing the features of various components such as filters or amplifiers. Additionally, to fully utilize the allocated bandwidth, there is a need for eliminating interference between adjacent channels which is caused by the Doppler effect as a transmitter device or a receiver device moves relative to each other.

SUMMARY

In an example, a transmitter device configured to transmit information via a wireless connection may include a baseband signal processor configured to process the information to generate a baseband signal with a baseband bandwidth; a modulator configured to modulate a radio frequency (RF) signal with an RF bandwidth based on the baseband signal; and a controller configured to adjust at least one of the baseband bandwidth and the RF bandwidth based on a movement of the transmitter device relative to a position of a receiver device configured to receive the RF signal.

In another example, a method for transmitting information via a wireless connection in a transmitter device may include processing, by a baseband signal processor, the information to generate a baseband signal with a baseband bandwidth; modulating, by a modulator, an RF signal with an RF bandwidth based on the baseband signal; and adjusting, by a controller, at least one of the baseband bandwidth and the RF bandwidth based on a movement of the transmitter device relative to a position of a receiver device configured to receive the RF signal.

In yet another example, a computer-readable storage medium may store a program for causing a processor configured to transmit information via a wireless connection in a transmitter device, the program including one or more instructions for processing, by a baseband signal processor, the information to generate a baseband signal with a baseband bandwidth; modulating, by a modulator, an RF signal with an RF bandwidth based on the baseband signal; and adjusting, by a controller, at least one of the baseband bandwidth and the RF bandwidth based on a movement of the transmitter device relative to a position of a receiver device configured to receive the RF signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a transmitter device configured to communicate with a receiver device while the transmitter device is moving relative to the receiver device in wireless communication. Further, technologies are herein generally described for a bandwidth control scheme for the transmitter device.

In some examples, the transmitter device may employ a bandwidth control scheme to adjust an occupied bandwidth depending on its movement or moving speed relative to a base station and/or a receiver device. The transmitter device may decrease its occupied bandwidth based on its movement relative to the base station and/or the receiver device. Further, if the transmitter device can obtain the movement information of the receiver device, the occupied bandwidth may be additionally reduced based on the movement of the receiver device.

In some examples, the transmitter device may be configured to process information (e.g., text messages, voice messages, video messages, etc.) generate baseband signal with a baseband bandwidth and modulate a radio frequency (RF) signal with an RF bandwidth based on the baseband signal. The transmitter device may adjust at least one of the baseband bandwidth and the RF bandwidth based on a movement of the transmitter device relative to a position of a receiver device configured to receive the RF signal.

In some examples, the transmitter device may adjust at least one of the baseband bandwidth and the RF bandwidth based on at least one of the movement of the transmitter device and a movement of the receiver device. In some other embodiments, the transmitter device may decrease at least one of the baseband bandwidth and the RF bandwidth in proportion to the movement of the transmitter device towards the receiver device. In yet some other embodiments, the transmitter device may decrease at least one of the baseband bandwidth and the RF bandwidth in proportion to the movement of the receiver device towards the transmitter device.

In some examples, the transmitter device may optionally receive GPS (global positioning system) information through an antenna and measure the movement of the transmitter based on the GPS information. In some other embodiments, the movement of the transmitter device may be measured based on triangulation information which may be received from a base station.

In some embodiments, the transmitter device may be a base station. In some other embodiments, the receiver device may be a base station.

Figure 1:
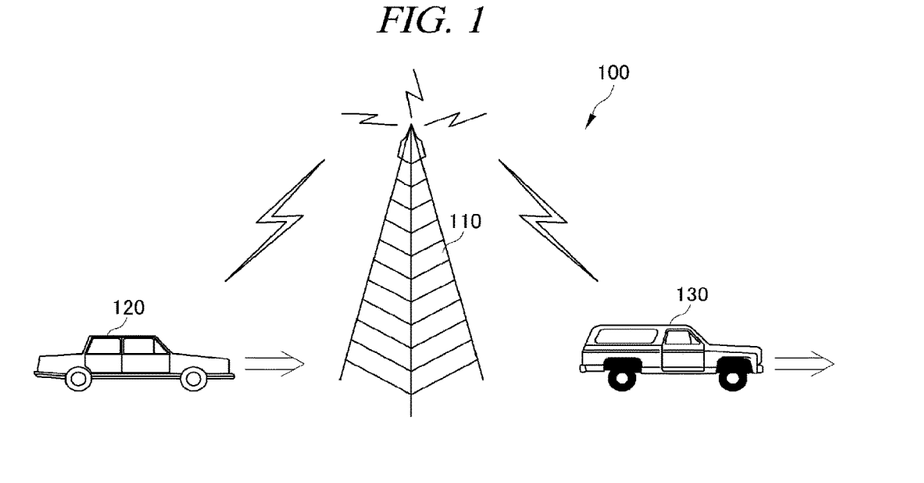
FIG. 1 schematically shows an illustrative example of a bandwidth control scheme based on a movement of a transmitter device relative to a receiver device, arranged in accordance with at least some embodiments described herein.

FIG. 1 schematically shows an illustrative example of a bandwidth control scheme based on a movement of a transmitter device relative to a receiver device, arranged in accordance with at least some embodiments described herein.

As depicted, in a wireless communication system 100, a transmitter device 120 may communicate with a base station 110 for communicating with a receiver device 130. In wireless communication system 100, transmitter device 120 may be stationary or move relative to base station 110 and/or receiver device 130. Also, receiver device 130 may be stationary to move relative to base station 110 and/or transmitter device 120.

In some embodiments, transmitter device 120 and receiver device 130 may be of any type of mobile electronic device or any type of automobile or vehicle including such mobile electronic device, where the mobile electronic device may be configured to store, retrieve, compute, transmit and/or receive data, including, for example, a smartphone, a mobile phone, a personal digital assistant (PDA), a tablet, a laptop computer, a desktop computer, etc. Also, transmitter device 120 and receiver device 130 may communicate with base station 110 via a wireless communication network such as, for example, a cellular network, a wireless wide area network (WAN), a wireless metropolitan area network (MAN), a wireless local area network (LAN), a wireless campus area network (CAN), etc. Although the below description describes that transmitter device 120, receiver device 130 and/or base station 110 perform several operations and/or functions in accordance with at least some embodiments, those skilled in the art will recognize that computer programs or program modules hosted by the respective entities may perform the operations and/or functions described herein.

In some embodiments, transmitter device 120 may employ a bandwidth control scheme to adjust an occupied bandwidth depending on its movement or moving speed relative to base station 110 and/or receiver device 130. Transmitter device 120 may decrease its occupied bandwidth based on its movement relative to base station 110 and/or receiver device 130. Further, if transmitter device 120 can obtain the movement information (e.g., change in position or moving speed) of receiver device 130, the occupied bandwidth may be additionally reduced based on the movement of receiver device 130. Such bandwidth control scheme may be employed to prevent interference between the channel allocated for transmitter device 120 and its adjacent channels, which may be caused by the Doppler effect, as discussed in detail below.

Figure 2A:
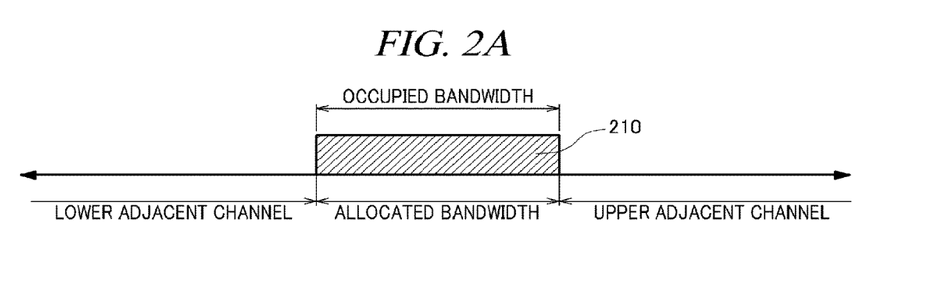
FIGS. 2A to 2C show a schematic chart illustrating the Doppler effect to frequency bandwidths allocated for wireless communication which may be caused by a movement of a transmitter device relative to a receiver device, arranged in accordance with at least some embodiments described herein.
Figure 2B:
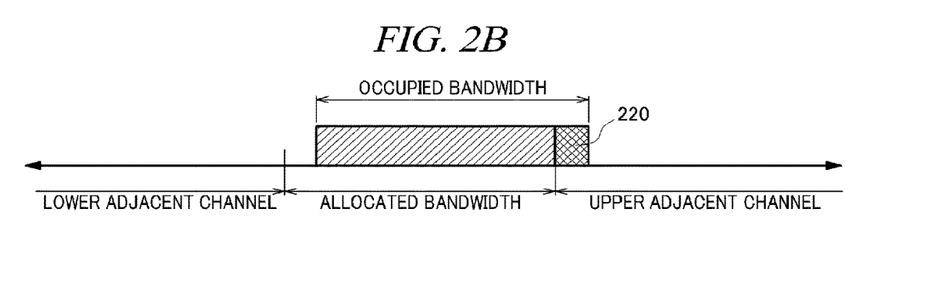
Figure 2C:
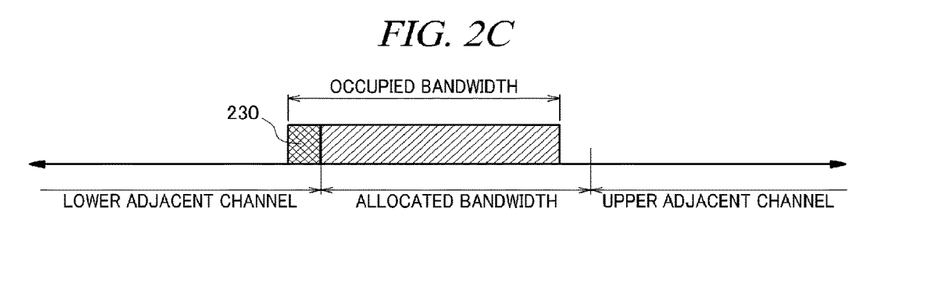

FIGS. 2A to 2C show a schematic chart illustrating the Doppler effect to frequency bandwidths allocated for wireless communication which may be caused by a movement of a transmitter device relative to a receiver device, arranged in accordance with at least some embodiments described herein.

As illustrated in FIG. 2A, if transmitter device 120 communicates with base station 110 via a designated wireless communication channel in a stationary state, transmitter device 120 may be able to fully utilize a bandwidth allocated for the designated channel. That is, the bandwidth occupied by the communication of transmitter device 120 (which is referred to as an "occupied bandwidth" 210) may be substantially equal to the bandwidth allocated for the designated channel (which is referred to as an "allocated bandwidth").

On the other hand, as depicted in FIG. 2B, if transmitter device 120 communicates with base station 110 while transmitter device 120 is approaching to base station 110, the occupied bandwidth for transmitter device 120 may get out of the allocated bandwidth due to the Doppler effect. The Doppler effect refers to the change in frequency of a wave signal (e.g., wireless communication signal) for an observer (e.g., base station 110) moving relative to its source. Specifically, when transmitter device 120 transmits a wireless communication signal toward base station 110 while it is approaching base station 110, the received frequency at base station 110 may be higher compared to the emitted frequency at transmitter device 120. As shown in FIG. 2B, the occupied bandwidth may be shifted up at its frequency and thus an upper part 220 of the occupied bandwidth may interfere with a frequency bandwidth of an upper adjacent channel.

Further, as illustrated in FIG. 2C, if receiver device 130 communicates with base station 110 while receiver device 130 is receding from base station 110, the occupied bandwidth for receiver device 130 may also get out of the allocated bandwidth due to the Doppler effect. Specifically, when base station 110 transmits a wireless communication signal (which is received from transmitter device 120) toward receiver device 130 receding from base station 110, the received frequency at receiver device 130 may be lower compared to the emitted frequency at base station 110. As shown in FIG. 2C, the occupied bandwidth may be shifted down at its frequency and thus a lower part 230 of the occupied bandwidth may interfere with a frequency bandwidth of a lower adjacent channel.

In some embodiments, to avoid or reduce the interference between the occupied bandwidth and the frequency bandwidths of adjacent channels, transmitter device 120 may employ a bandwidth control scheme to reduce the occupied bandwidth depending on its movement or moving speed relative to base station 110 and/or receiver device 130. Further, if transmitter device 120 can obtain the movement information of receiver device 130, the occupied bandwidth may be additionally reduced based on the movement of receiver device 130. Similarly, such bandwidth control scheme may be employed by base station 110.

Figure 3A:
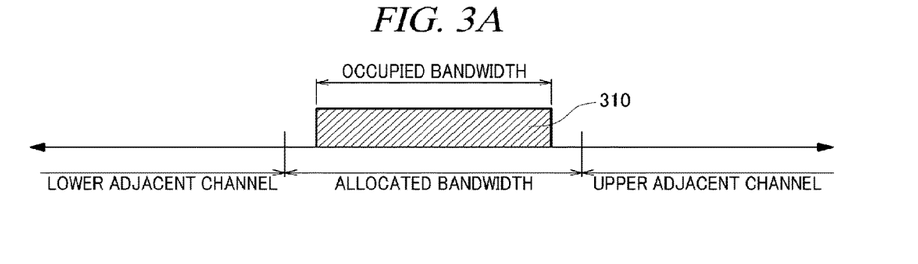
FIGS. 3A to 3C show a schematic chart illustrating an occupied bandwidth for a transmitter device that is adjusted according to a bandwidth control scheme, arranged in accordance with at least some embodiments described herein.
Figure 3B:
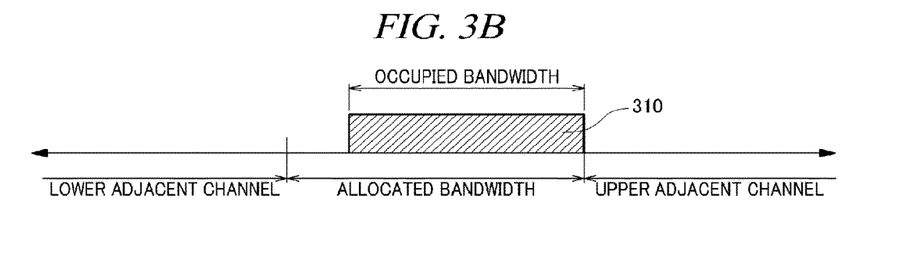
Figure 3C:
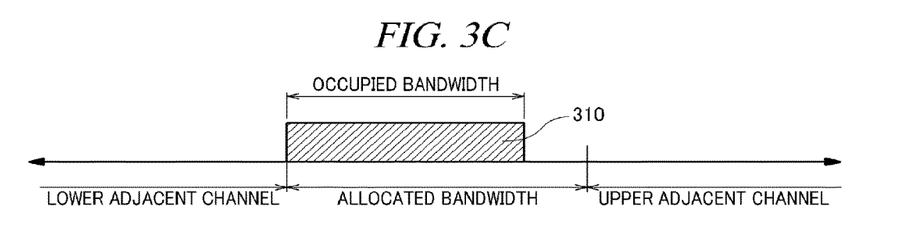

FIGS. 3A to 3C show a schematic chart illustrating an occupied bandwidth for a transmitter device that is adjusted according to a bandwidth control scheme, arranged in accordance with at least some embodiments described herein.

In some embodiments, as illustrated in FIG. 3A, if transmitter device 120 is moving relative to base station 110 or receiver device 130, transmitter device 120 may be configured to reduce occupied bandwidth 310 based on its movement or moving speed relative to base station 110 or receiver device 130. As discussed in detail below, such adjustment of occupied bandwidth 310 may be performed by a baseband signal processor or an RF modulator installed in transmitter device 120 or base station 110.

By way of example, but not limitation, as depicted in FIG. 2B, if transmitter device 120 communicates with receiver device 130 via base station 110 while transmitter device 120 is approaching base station 110, occupied bandwidth 310 for transmitter device 120 may be shifted up at its frequency. However, because occupied bandwidth 310 has been reduced based on the relative movement of transmitter device 120 to base station 110, occupied bandwidth 310 may be still within the allocated bandwidth for transmitter device 120 and does not interfere with a frequency bandwidth of an upper adjacent channel.

By way of another example, but not limitation, as illustrated in FIG. 3C, if transmitter device 120 communicates with receiver device 130 via base station 110 while receiver device 130 is receding from base station 110, occupied bandwidth 310 may be shifted down at its frequency. However, because occupied bandwidth 310 has been reduced based on the relative movement of transmitter device 120 to receiver device 130, occupied bandwidth 310 may be still within the allocated bandwidth for transmitter device 120 and does not interfere with a frequency bandwidth of a lower adjacent channel.

Figure 4:
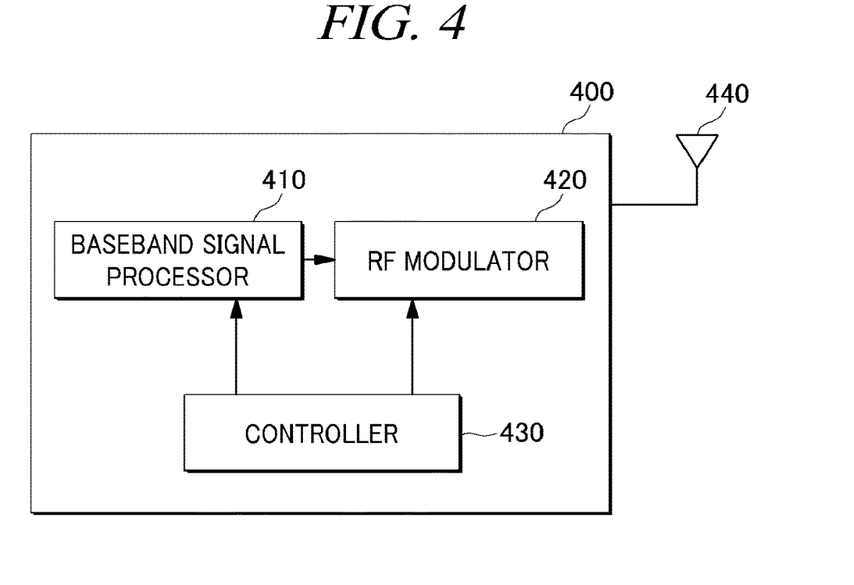
FIG. 4 shows a schematic block diagram illustrating an example architecture of a transmitter device for implementing a bandwidth control scheme, arranged in accordance with at least some embodiments described herein.

FIG. 4 shows a schematic block diagram illustrating an example architecture of a transmitter device for implementing a bandwidth control scheme, arranged in accordance with at least some embodiments described herein.

As depicted, a transmitter device 400 may include a baseband signal processor 410, an RF modulator 420, and a controller 430. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Baseband signal processor 410 may be configured to process information (e.g., communication data such as text messages, voice messages, video messages, etc.) to generate a baseband signal with a baseband bandwidth.

RF modulator 420 may be configured to modulate an RF signal with an RF bandwidth based on the baseband signal. That is, RF modulator 420 may use the baseband signal to modulate a higher frequency carrier wave to be transmitted via an antenna 440.

Controller 430 may be configured to adjust at least one of the baseband bandwidth and the RF bandwidth based on a movement of transmitter device 400 relative to a position of a receiver device (e.g., base station 110 or receiver device 130) configured to receive the RF signal. In some embodiments, controller 430 may control baseband signal processor 410 to adjust the baseband bandwidth based on the movement of transmitter device 400 relative to the receiver device. Additionally or alternatively, controller 430 may control RF modulator 420 to adjust the RF bandwidth based on the movement of transmitter device 400 relative to the receiver device.

In some embodiments, controller 430 may be configured to adjust at least one of the baseband bandwidth and the RF bandwidth based on at least one of the movement of transmitter device 400 and a movement of a receiver device (e.g., base station 110 or receiver device 130). In some other embodiments, controller 430 may be configured to decrease at least one of the baseband bandwidth and the RF bandwidth in proportion to the movement of transmitter device 400 towards the receiver device. In yet some other embodiments, controller 430 may be configured to decrease at least one of the baseband bandwidth and the RF bandwidth in proportion to the movement of the receiver device towards transmitter device 400.

In some embodiments, transmitter device 400 may optionally receive GPS information through antenna 440 and measure the movement of transmitter device 400 based on the GPS information. In some other embodiments, the movement of transmitter device 400 may be measured based on triangulation information, which may be received from a base station (e.g., base station 110).

In some embodiments, the above configuration of transmitter device 400 may be implemented either in transmitter device 120 or base station 110.

Figure 5:
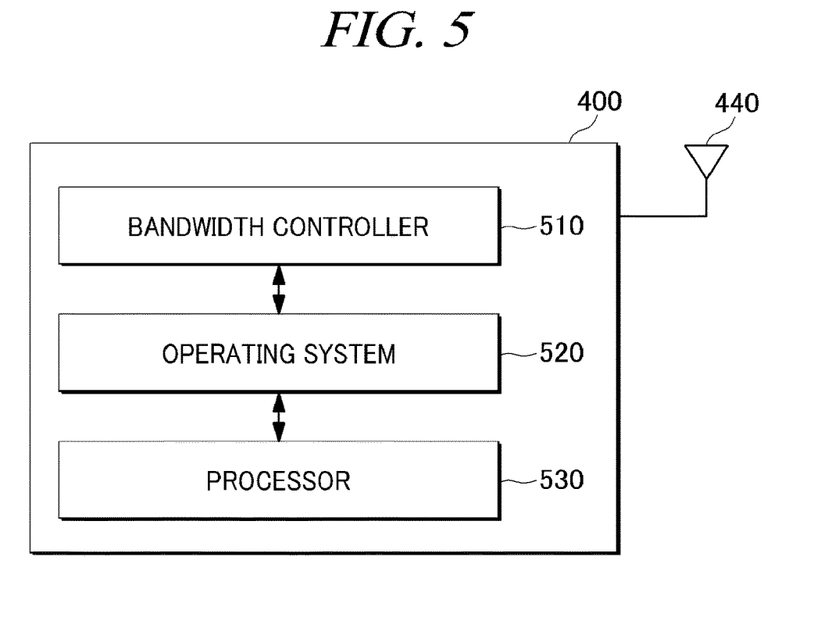
FIG. 5 shows a schematic block diagram illustrating another example architecture of a transmitter device for implementing a bandwidth control scheme, arranged in accordance with at least some embodiments described herein.

FIG. 5 shows a schematic block diagram illustrating another example architecture of a transmitter device for implementing a bandwidth control scheme, arranged in accordance with at least some embodiments described herein.

As depicted, transmitter device 400 may include a bandwidth controller 510, an operating system 520, and a processor 530. Bandwidth controller 510 may be an application adapted to operate on operating system 520 such that the bandwidth control scheme as described herein may be provided. Operating system 520 may allow bandwidth controller 510 to manipulate processor 530 to implement the bandwidth control scheme as described herein.

Figure 6:
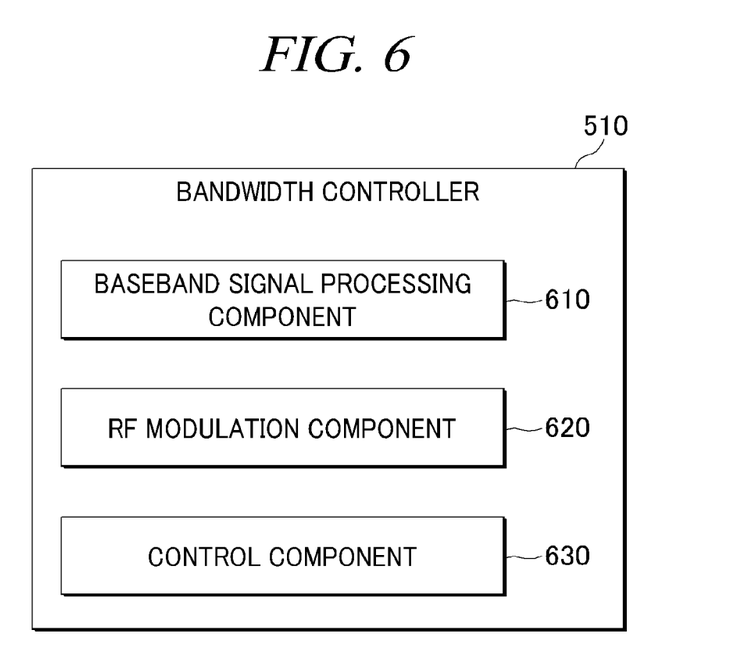
FIG. 6 shows a schematic block diagram illustrating an example architecture of a bandwidth controller for implementing a bandwidth control scheme, arranged in accordance with at least some embodiments described herein.

FIG. 6 shows a schematic block diagram illustrating an example architecture of a bandwidth controller for implementing a bandwidth control scheme, arranged in accordance with at least some embodiments described herein.

As depicted, bandwidth controller 510 may include a baseband signal processing component 610, an RF modulation component 620, and a control component 630.

Baseband signal processing component 610 may be adapted to process information (e.g., communication data such as text messages, voice messages, video messages, etc.) to generate a baseband signal with a baseband bandwidth.

RF modulation component 620 may be adapted to modulate an RF signal with an RF bandwidth based on the baseband signal. That is, RF modulation component 620 may use the baseband signal to modulate a higher frequency carrier wave to be transmitted via an antenna 440.

Control component 630 may be adapted to adjust at least one of the baseband bandwidth and the RF bandwidth based on a movement of transmitter device 400 relative to a position of a receiver device (e.g., base station 110 or receiver device 130) configured to receive the RF signal. In some embodiments, control component 630 may be configured to adjust at least one of the baseband bandwidth and the RF bandwidth based on at least one of the movement of transmitter device 400 and a movement of the receiver device. In some other embodiments, control component 630 may be configured to decrease at least one of the baseband bandwidth and the RF bandwidth in proportion to the movement of transmitter device 400 towards the receiver device.

Figure 7:
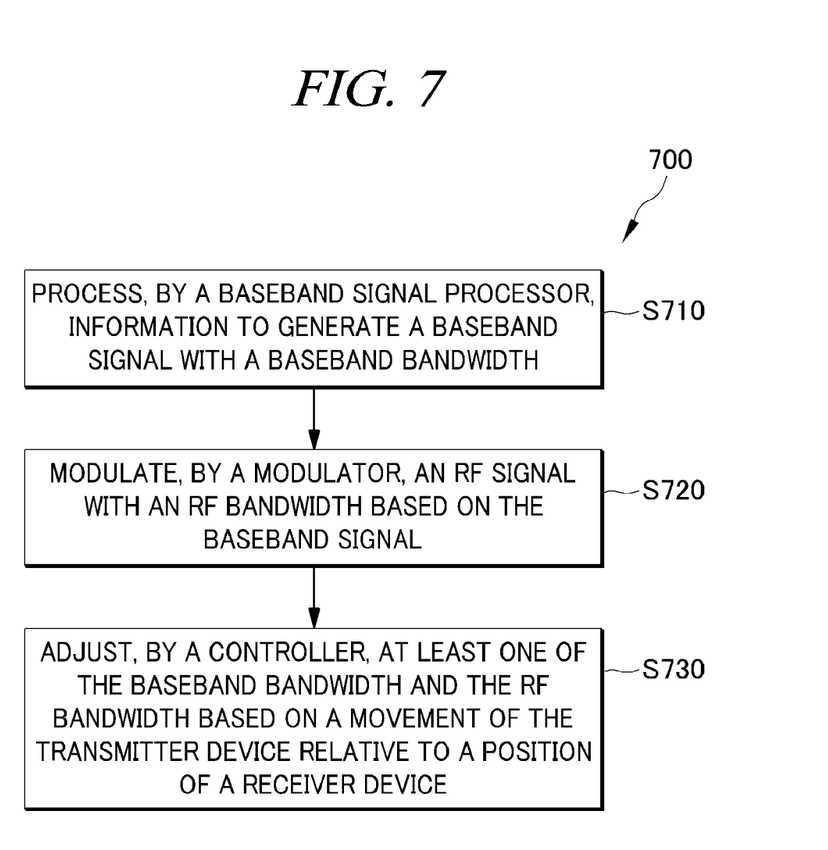
FIG. 7 shows an example flow diagram of a process for a transmitter device implementing a bandwidth control scheme, arranged in accordance with at least some embodiments described herein.

FIG. 7 shows an example flow diagram of a process 700 for a transmitter device implementing a bandwidth control scheme, arranged in accordance with at least some embodiments described herein.

Process 700 may be implemented in a transmitter device such as transmitter device 400 including a baseband signal processor 410, an RF modulator 420, and a controller 430. Process 700 may also be implemented by computer programs or program modules that are adapted to provide the bandwidth control scheme and hosted by a transmitter device, such as bandwidth controller 510 including baseband signal processing component 610, RF modulation component 620, and control component 630. Process 700 may include one or more operations, actions, or functions as illustrated by one or more blocks S710, S720 and/or S730. Although illustrated as discrete blocks, various blocks may be divided into additional blocks, combined into fewer blocks, or eliminated, depending on the desired implementation. Processing may begin at block S710.

At block S710 (Process, by a Baseband Signal Processor, Information to Generate a Baseband Signal with a Baseband Bandwidth), transmitter device 120 or 400 (e.g., baseband signal processor 410) and/or bandwidth controller 510 (e.g., baseband signal processing component 610) may process information (e.g., communication data such as text messages, voice messages, video messages, etc.) to generate baseband signal with a baseband bandwidth. Processing may continue from block S710 to block S720.

At block S720 (Modulate, by a Modulator, an RF Signal with an RF Bandwidth based on the Baseband Signal), transmitter device 120 or 400 (e.g., RF modulator 420) and/or bandwidth controller 510 (e.g., RF modulation component 620) may modulate an RF signal with an RF bandwidth based on the baseband signal. Processing may continue from block S720 to block S730.

At block S730 (Adjust, by a Controller, at Least One of the Baseband Bandwidth and the RF Bandwidth based on a Movement of the Transmitter Device Relative to a Position of a Receiver Device), transmitter device 120 or 400 (e.g., controller 430) and/or bandwidth controller 510 (e.g., control component 630) may adjust at least one of the baseband bandwidth and the RF bandwidth based on a movement of the transmitter device relative to a position of a receiver device configured to receive the RF signal. In some embodiments, transmitter device 120 or 400 may be further configured to adjust at least one of the baseband bandwidth and the RF bandwidth based on at least one of the movement of the transmitter device and a movement of the receiver device. Alternatively or additionally, transmitter device 120 or 400 may be configured to decrease at least one of the baseband bandwidth and the RF bandwidth in proportion to the movement of the transmitter device towards the receiver device.

As such, transmitter device 120 or 400 and/or bandwidth controller 510 may prevent the occupied bandwidth from invading the adjacent channels even in case that the occupied bandwidth is shifted up/down due to the Doppler effect when transmitter device 120 or 400 is moving relative to base station 110 or receiver device 130.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
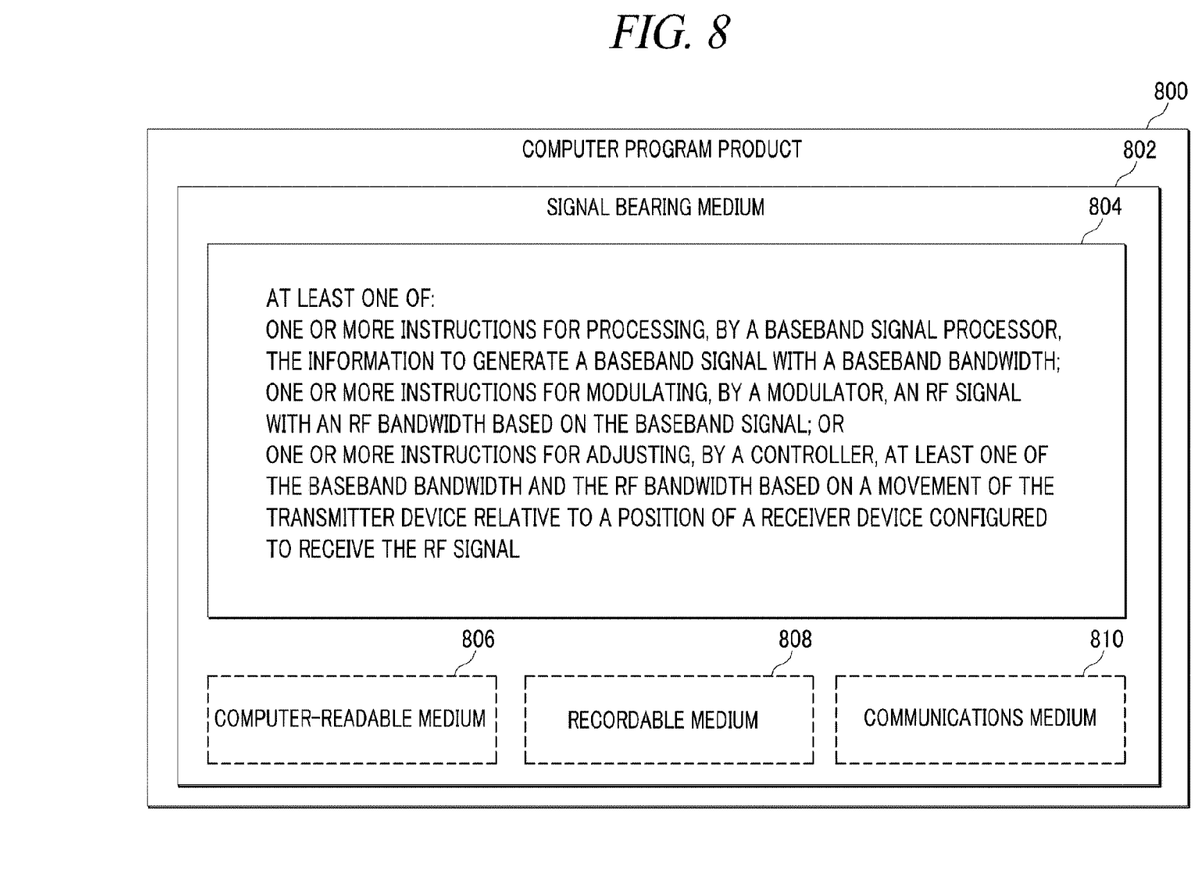
FIG. 8 illustrates an example computer program product that may be utilized to implement a bandwidth control scheme, arranged in accordance with at least some embodiments described herein.

FIG. 8 illustrates an example computer program product that may be utilized to implement a bandwidth control scheme, arranged in accordance with at least some embodiments described herein.

Computer program product 800 may be hosted by a transmitter device, such as transmitter device 120 or 400. As depicted, computer program product 800 may include a signal bearing medium 802. Signal bearing medium 802 may include one or more instructions 804 that, when executed by, for example, a processor, may provide the functionality described above with respect to FIGS. 1-7. By way of example, instructions 804 may include: one or more instructions for processing, by a baseband signal processor, the information to generate a baseband signal with a baseband bandwidth; one or more instructions for modulating, by a modulator, an RF signal with an RF bandwidth based on the baseband signal; or one or more instructions for adjusting, by a controller, at least one of the baseband bandwidth and the RF bandwidth based on a movement of the transmitter device relative to a position of a receiver device configured to receive the RF signal. Thus, for example, referring to FIGS. 1-6, transmitter device 120 or 400 and/or bandwidth controller 510 may undertake one or more of the blocks shown in FIG. 7 in response to instructions 804.

In some implementations, signal bearing medium 802 may encompass a computer-readable medium 806, such as, but not limited to, a hard disk drive (HDD), a compact disk (CD), a digital versatile disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, computer program product 800 may be conveyed to one or more modules of transmitter device 120 or 400 and/or bandwidth controller 510 by an RF signal bearing medium 802, where the signal bearing medium 802 is conveyed by a wireless communications medium 810 (e.g., a wireless communications medium conforming with the IEEE 802.11 standard).

Figure 9:
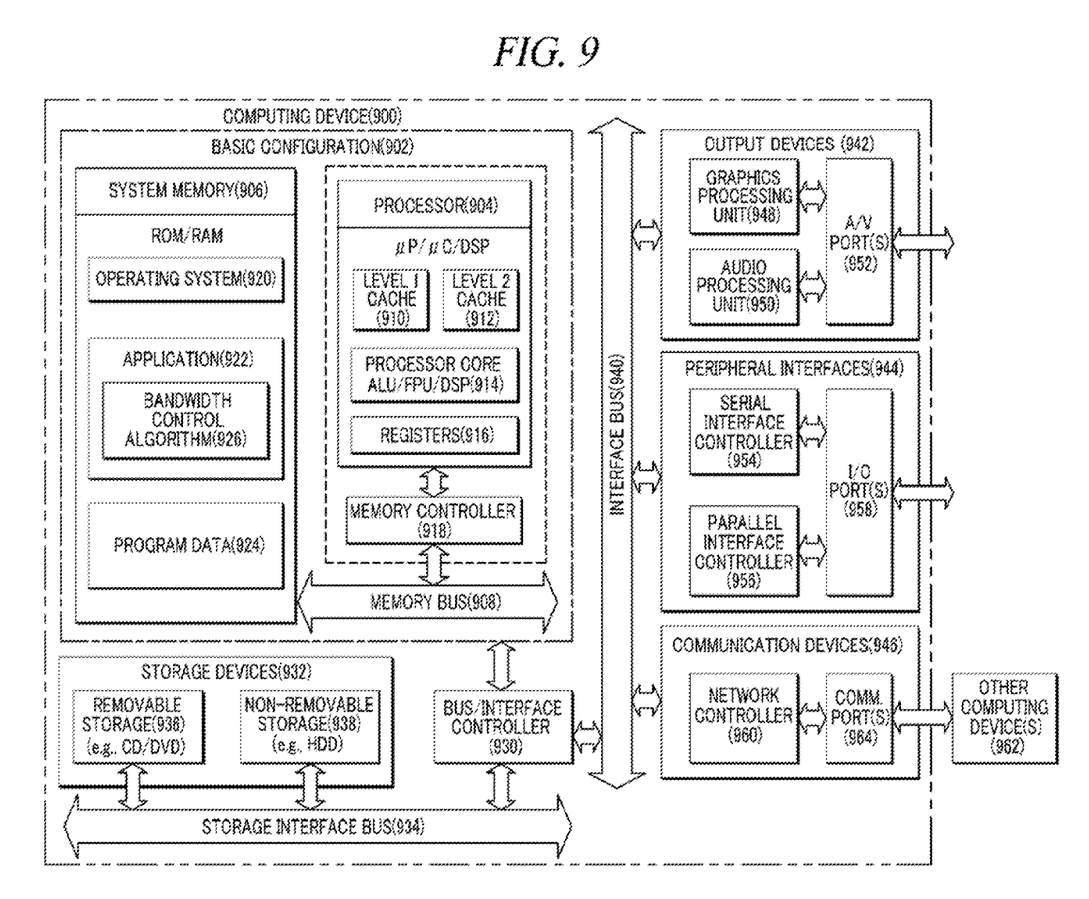
FIG. 9 is a block diagram illustrating an example computing device that may be utilized to implement a bandwidth control scheme, arranged in accordance with at least some embodiments described herein.

FIG. 9 is a block diagram illustrating an example computing device that may be utilized to implement a bandwidth control scheme, arranged in accordance with at least some embodiments described herein.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP core), or any combination thereof. An example memory controller 918 may also be used with processor 904, or in some implementations, memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include a bandwidth control algorithm 926 that may be arranged to perform the functions as described herein including the actions described with respect to the transmitter device 120 or 400 architecture as shown in FIGS. 2-6 or including the actions described with respect to the flow charts shown in FIG. 7. Program data 924 may include any data that may be useful for providing the bandwidth control scheme as is described herein. In some examples, application 922 may be arranged to operate with program data 924 on an operating system 920 such that the bandwidth control scheme as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A portable transmitter device configured to transmit information via a wireless connection, the portable transmitter device comprising:
    a baseband signal processor configured to process the information to generate a baseband signal with a baseband bandwidth;
    a modulator configured to modulate a radio frequency (RF) signal with an RF bandwidth, wherein the modulation is based on the baseband signal; and
    a controller configured to correct respective Doppler effect-induced bandwidth shifts by reduction in the baseband bandwidth and the RF bandwidth based on a moving speed of the portable transmitter device relative to a position of a receiver device that is configured to receive the RF signal.

2. The portable transmitter device of claim 1, wherein the controller is configured to reduce at least one of the baseband bandwidth and the RF bandwidth based on at least one of the moving speed of the portable transmitter device and a moving speed of the receiver device.

3. The portable transmitter device of claim 1, wherein the controller is configured to reduce at least one of the baseband bandwidth and the RF bandwidth in proportion to the moving speed of the portable transmitter device towards the receiver device.

4. The portable transmitter device of claim 3, wherein the receiver device is a base station.

5. The portable transmitter device of claim 1, wherein the controller is configured to reduce at least one of the baseband bandwidth and the RF bandwidth in proportion to the moving speed of the receiver device towards the portable transmitter device.

6. The portable transmitter device of claim 1, wherein the portable transmitter device is selected from a group consisting of a cell phone, a personal data assistant (PDA), a personal media player device, a wireless web watch device, a personal headset device, an application specific device, and a laptop computer.

7. The portable transmitter device of claim 1, wherein the moving speed of the portable transmitter device is measured based on global positioning system (GPS) information.

8. The portable transmitter device of claim 1, wherein the moving speed of the portable transmitter device is measured based on triangulation information.

9. A method to transmit information via a wireless connection in a portable transmitter device, the method comprising:
processing, by a baseband signal processor, the information to generate a baseband signal with a baseband bandwidth;
modulating, by a modulator and based on the baseband signal, a radio frequency (RF) signal with an RF bandwidth; and
correcting, by a controller, respective Doppler effect-induced bandwidth shifts by reducing the baseband bandwidth and the RF bandwidth based on a moving speed of the portable transmitter device relative to a position of a receiver device configured to receive the RF signal.

10. The method of claim 9, wherein reducing at least one of the baseband bandwidth and the RF bandwidth comprises reducing at least one of the baseband bandwidth and the RF bandwidth based on at least one of the moving speed of the portable transmitter device and a moving speed of the receiver device.

11. The method of claim 9, wherein reducing at least one of the baseband bandwidth and the RF bandwidth comprises reducing at least one of the baseband bandwidth and the RF bandwidth in proportion to the moving speed of the portable transmitter device towards the receiver device.

12. The method of claim 9, wherein reducing at least one of the baseband bandwidth and the RF bandwidth comprises reducing at least one of the baseband bandwidth and the RF bandwidth in proportion to the moving speed of the receiver device towards the portable transmitter device.

13. The method of claim 9, further comprising measuring the moving speed of the portable transmitter device based on global positioning system (GPS) information.

14. The method of claim 9, further comprising measuring the moving speed of the portable transmitter device based on triangulation information.

15. A non-transitory computer-readable storage medium which stores a program to cause a processor to transmit information via a wireless connection in a portable transmitter device, the program comprising one or more instructions to:
process, by a baseband signal processor, the information to generate a baseband signal with a baseband bandwidth;
modulate, by a modulator and based on the baseband signal, a radio frequency (RF) signal with an RF bandwidth; and
correct, by a controller, respective Doppler effect-induced bandwidth shifts by reduction in the baseband bandwidth and the RF bandwidth based on a moving speed of the portable transmitter device relative to a position of a receiver device configured to receive the RF signal.

16. The non-transitory computer-readable storage medium of claim 15, wherein the operations to reduce at least one of the baseband bandwidth and the RF bandwidth comprise operations to reduce at least one of the baseband bandwidth and the RF bandwidth based on at least one of the moving speed of the portable transmitter device and a moving speed of the receiver device.

17. The non-transitory computer-readable storage medium of claim 15, wherein the operations to reduce at least one of the baseband bandwidth and the RF bandwidth comprise operations to reduce at least one of the baseband bandwidth and the RF bandwidth in proportion to the moving speed of the portable transmitter device towards the receiver device.

18. The non-transitory computer-readable storage medium of claim 15, wherein the operations to reduce at least one of the baseband bandwidth and the RF bandwidth comprise operations to reduce at least one of the baseband bandwidth and the RF bandwidth in proportion to the moving speed of the receiver device towards the portable transmitter device.

19. The non-transitory computer-readable storage medium of claim 15, wherein the program further comprises one or more instructions to measure the moving speed of the portable transmitter device based on global positioning system (GPS) information.

20. The non-transitory computer-readable storage medium of claim 15, wherein the program further comprises one or more instructions to measure the moving speed of the portable transmitter device based on triangulation information.

* * * * *

UNITED STATES PATENT AND TRADEMARK OFFICE
CERTIFICATE OF CORRECTION

PATENT NO. : 9,854,563 B2
APPLICATION NO. : 14/118707
DATED : December 26, 2017
INVENTOR(S) : Lee Page 1 of 1

It is certified that error appears in the above-identified patent and that said Letters Patent is hereby corrected as shown below:

In the Specification

In Column 7, Line 50, delete "5730." and insert -- S730. --, therefor.

In Column 8, Line 3, delete "block 5730." and insert -- block S730. --, therefor.

In Column 8, Line 4, delete "block 5730" and insert -- block S730 --, therefor.

Signed and Sealed this
First Day of May, 2018

Andrei Iancu
*Director of the United States Patent and Trademark Office*